United States Patent
Ku et al.

(10) Patent No.: US 9,386,131 B2
(45) Date of Patent: Jul. 5, 2016

(54) METHOD AND APPARATUS FOR PERFORMING FUNCTION BY COMBINING ONE OR MORE FUNCTION BLOCKS

(71) Applicant: Samsung Electronics Co., Ltd., Suwon-Si, Gyeonggi-Do (KR)

(72) Inventors: Ji-yeon Ku, Yongin-si (KR); Sang-hyun Lee, Hwaseong-si (KR); Sung-woo Hwang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 30 days.

(21) Appl. No.: 14/147,921

(22) Filed: Jan. 6, 2014

(65) Prior Publication Data

US 2015/0065196 A1  Mar. 5, 2015

(30) Foreign Application Priority Data

Aug. 29, 2013 (KR) .................. 10-2013-0103431

(51) Int. Cl.
  *H04M 1/02* (2006.01)
  *H04M 1/725* (2006.01)

(52) U.S. Cl.
  CPC ........ *H04M 1/0254* (2013.01); *H04M 1/72575* (2013.01)

(58) Field of Classification Search
  CPC .......... H04M 1/0254; H04M 1/72527; H04M 1/0256; H04M 1/7253
  See application file for complete search history.

(56) References Cited

U.S. PATENT DOCUMENTS

| | | | |
|---|---|---|---|
| 5,303,291 A * | 4/1994 | Takagi et al. | 379/433.13 |
| 5,521,976 A * | 5/1996 | Janosch et al. | 379/397 |
| 8,391,921 B2 | 3/2013 | Moran et al. | |
| 2004/0060776 A1* | 4/2004 | Tyni et al. | 187/380 |
| 2004/0137935 A1* | 7/2004 | Zarom | 455/550.1 |
| 2006/0198601 A1* | 9/2006 | Oe et al. | 385/147 |
| 2007/0099593 A1* | 5/2007 | Thome et al. | 455/349 |
| 2007/0259648 A1* | 11/2007 | Moon | 455/411 |
| 2009/0036162 A1* | 2/2009 | Hsu | 455/557 |

FOREIGN PATENT DOCUMENTS

| | | |
|---|---|---|
| KR | 20090078442 A | 7/2009 |
| KR | 20100071867 A | 6/2010 |
| KR | 20100089650 A | 8/2010 |
| KR | 20130022027 A | 3/2013 |
| KR | 20140029876 A | 3/2014 |

* cited by examiner

*Primary Examiner* — Kashif Siddiqui
*Assistant Examiner* — Minjung Kim
(74) *Attorney, Agent, or Firm* — Harness, Dickey & Pierce, P.L.C.

(57) ABSTRACT

A method of performing a function by combining one or more blocks including sensing whether the one or more blocks are connected, determining indexes respectively corresponding to the connected one or more blocks, deciding, by using the indexes, a function to be performed based on the sensing, the function being one of a plurality of functions, each function associated with a respective set of function blocks, and generating a control signal for performing the decided function may be provided.

19 Claims, 7 Drawing Sheets

| | $X_0$ | $X_1$ | $X_2$ | $X_3$ | $X_4$ | $X_5$ | $X_6$ | $X_7$ |
|---|---|---|---|---|---|---|---|---|
| $E_1$ | 2 | 1 | | 1 | 1 | | | |
| $E_2$ | 10 | 1 | | | 1 | | | |
| $E_3$ | 7 | | 1 | 1 | | | 1 | |
| $E_4$ | 3 | | | 1 | 1 | | 1 | 1 |
| $E_5$ | 4 | | | | 1 | 1 | | 1 |

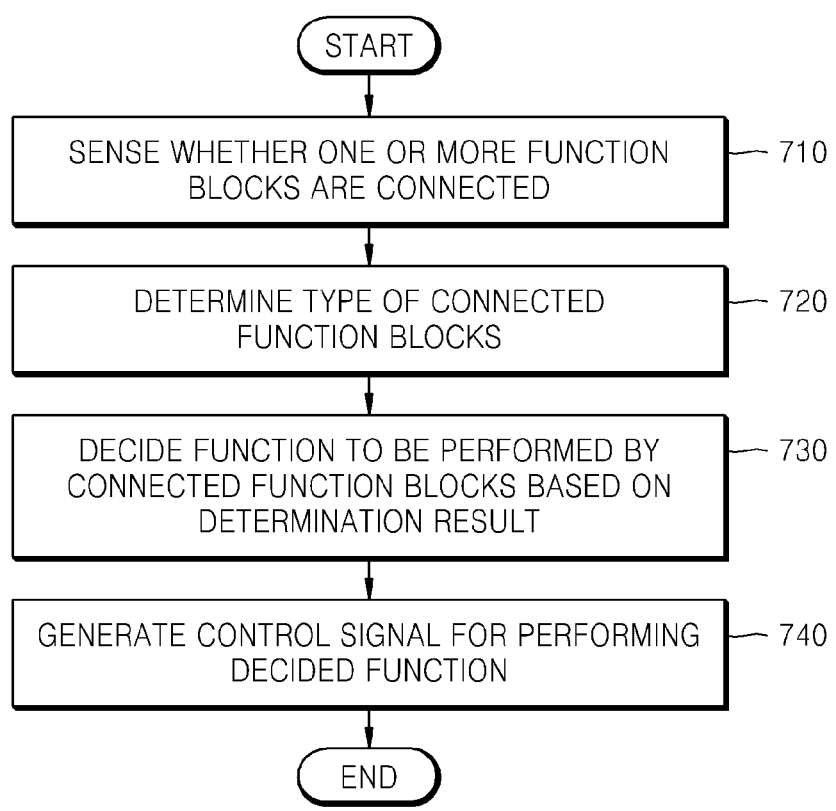

METHOD AND APPARATUS FOR PERFORMING FUNCTION BY COMBINING ONE OR MORE FUNCTION BLOCKS

CROSS-REFERENCE TO RELATED APPLICATIONS

This application claims priority under 35 U.S.C. §119 to Korean Patent Application No. 10-2013-0103431, filed on Aug. 29, 2013, in the Korean Intellectual Property Office, the disclosure of which is incorporated herein in its entirety by reference.

BACKGROUND

1. Field some example embodiments provide methods and/or apparatuses for performing a function by combining one or more function blocks.

2. Description of the Related Art

Recently, terminals capable of performing a plurality of functions have been introduced to the market. For example, smartphones perform not only a simple call function but also various other functions, for example, capturing a picture or video, sensing an object, a web-page searching, etc. Further, traditional articles, for example, glasses and watches, have been developed to perform various other functions (e.g., a web-page searching), in addition to traditional functions of the devices.

However, because an apparatus capable of performing a plurality of functions are configured such that blocks for performing the plurality of functions are not separated, it is difficult to reduce a volume of each block. Further, the whole apparatus consumes unnecessary power due to functions not currently used.

SUMMARY

Some example embodiments provide methods and/or apparatuses for performing a function by combining one or more function blocks.

Some example embodiments provide non-transitory computer-readable storage media having stored therein program instructions, which when executed by a computer, perform the methods.

Additional aspects of example embodiments will be set forth in part in the description which follows and, in part, will be apparent from the description, or may be learned by practice of the example embodiments.

According to an aspect of the present invention, a method of performing a function by combining one or more function blocks includes sensing whether the one or more function blocks are connected, determining indexes respectively corresponding to the connected one or more function blocks, deciding, by using the indexes, a function to be performed based on the sensing, the function being one of a plurality of functions, each function associated with a respective set of function blocks, and generating a control signal for performing the decided function.

According to another aspect of the present invention, a non-transitory computer-readable storage medium has stored therein program instructions, which when executed by a computer, perform the method.

According to another aspect of the present invention, an apparatus includes an interface unit configured to sense whether the one or more function blocks are connected, a decision unit configured to determine indexes respectively corresponding to the connected one or more function blocks, and configured to decide, by using the indexes, a function to be performed based on the sensing, the function being one of a plurality of functions, each function associated with a respective set of the one or more function blocks; and a control unit configured to generate a control signal for performing the decided function.

BRIEF DESCRIPTION OF THE DRAWINGS

These and/or other aspects will become apparent and more readily appreciated from the following description of the example embodiments, taken in conjunction with the accompanying drawings in which:

FIG. 7 is a flowchart of a method of performing a function by combining one or more function blocks, according to an example embodiment.

DETAILED DESCRIPTION

Figure 1:
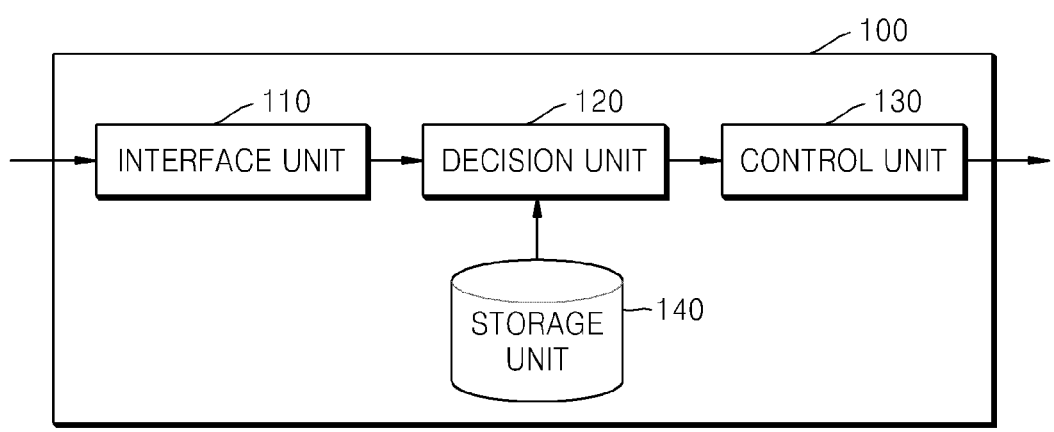
FIG. 1 is a block diagram of a processing apparatus according to an example embodiment.

Various example embodiments will be described more fully hereinafter with reference to the accompanying drawings, in which some example embodiments are shown. Example embodiments may, however, be embodied in many different forms and should not be construed as limited to the example embodiments set forth herein. Rather, these example embodiments are merely provided so that this disclosure will be thorough and complete, and will fully convey the scope of example embodiments to those skilled in the art. In the drawings, the sizes and relative sizes of the various layers and regions may have been exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in further detail with reference to the accompanying drawings.

FIG. 1 is a block diagram of a function block 100 according to an example embodiment.

Referring to FIG. 1, the function block 100 may include an interface unit 110, a decision unit 120, a control unit 130, and a storage unit 140. Only components related to the current embodiment are shown in the function block 100 of FIG. 1. Thus, it will be understood by one of ordinary skill in the art that other general-use components may be further included in addition to the components shown in FIG. 1.

Further, it will be understood by one of ordinary skill in the art that each of the interface unit 110, the decision unit 120, the control unit 130, and the storage unit 140 in the function block 100 of FIG. 1 may be an independent device.

Further, the interface unit 110, the decision unit 120, the control unit 130, and the storage unit 140 in the function block 100 of FIG. 1 may correspond to one or a plurality of processors. Each of the processors may be implemented by an array of a plurality of logic gates or a combination of a general-use microprocessor and a memory in which a program executable by the microprocessor is stored. In addition, it will be understood by one of ordinary skill in the art that each of the processors may be implemented by another form of hardware.

The function block 100 of FIG. 1 may refer to any one of one or more function blocks 100 included in a terminal. The terminal may correspond to any device for performing two or more functions. For example, the terminal may include not only any electronic device, for example, a cellular phone, a mini computer, a digital terminal, etc., but also may include any traditional article in which a miniaturized integrated circuit is embedded. The traditional article may include an accessory, e.g., glasses, a watch, a ring, or a necklace.

The function block 100 refers to an element for performing a function of the terminal. For example, if the terminal is a smartphone, the function block 100 included in the smartphone may refer to a unit including a camera for performing a photographing function or a unit for displaying an image. For example, one function block 100 including a camera and another function block 100 including a display device may be connected to each other, and the connected function blocks 100 may perform a function of outputting an image captured by the camera to the display device. Although an image capturing function and a screen display function have been described as examples of functions included in the terminal, example embodiments are not limited thereto.

The function block 100 may refer to a unit of two or more function blocks that are physically separated from the terminal or units segmented in correspondence with respective functions performed by the terminal. Thus, the function block 100 may refer to an independent device separated from the terminal or an electronic circuit portion for performing a function. The electronic circuit portion may be included in the terminal and may not be physically separated from the other portions of the electronic circuit or the terminal.

Function blocks physically separated from a terminal will now be described with reference to FIGS. 2A and 2B.

Figure 2A:
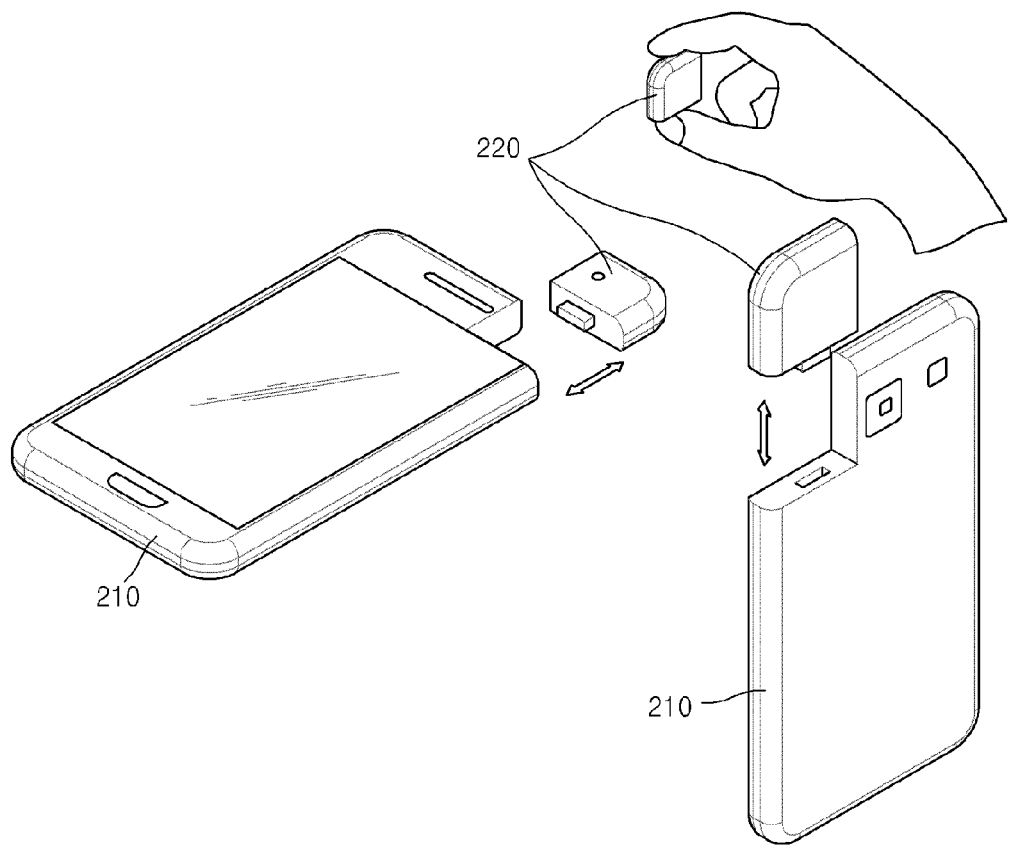
FIGS. 2A and 2B illustrate function blocks according to example embodiments.
Figure 2B:
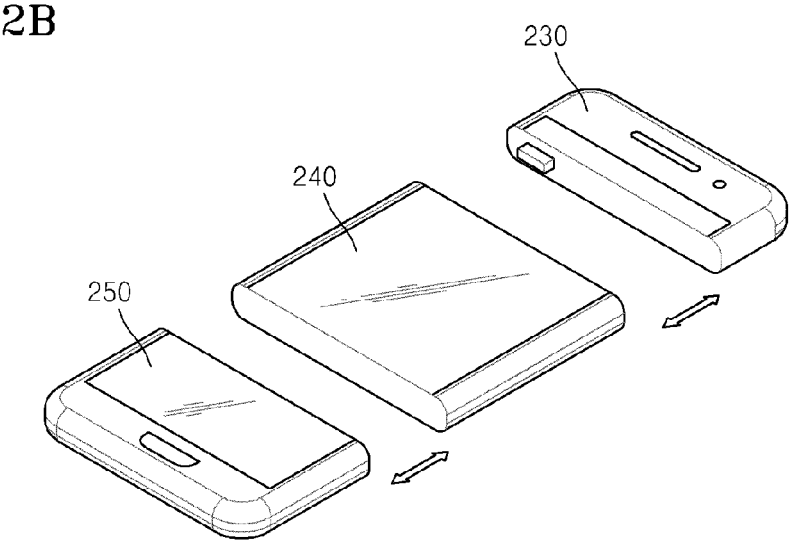

FIGS. 2A and 2B illustrate function blocks according to example embodiments.

Referring to FIG. 2A, a terminal 210 may include one or more function blocks 220. According to an example embodiment, the terminal 210 may include a separate function block 220 which independently performs at least one function from among a plurality of functions of the terminal 210. For example, if the terminal 210 has a photographing function, the terminal 210 may include a function block 220 including a camera for photographing. The function block 220 may independently perform at least one function or may be combined with the terminal 210 to perform the at least one function.

Referring to FIG. 2B, a terminal may include a plurality of function blocks 230, 240, and 250. Although the terminal is shown to include three function blocks 230, 240, and 250, example embodiments are not limited thereto.

For example, if the terminal of FIG. 2B is capable of capturing an image, displaying an image, and inputting and outputting voice, one of the function blocks (e.g., function block 230) may perform a capturing function, another one of the function blocks (e.g., function block 240) may perform a display function, and the other one of the function blocks (e.g., function block 250) may perform a voice input and output function.

Functions to be performed by the terminal are not limited to image capturing, image display, and voice input and output. For example, the terminal may include, for instance, a wired/wireless communication function, and/or an object sensing function. The wireless communication may include, for instance, cellular communication (e.g., third generation (3G), 4G, long term evolution (LTE), wireless local area network, Bluetooth, infrared-ray (IR) communication, near field wireless communication, or visible light communication. For example, the function blocks 230, 240, and 250 may be an element for inputting data (e.g., a camera, an illumination sensor, a pressure sensor, or a microphone), an element for outputting data (e.g., a screen, a speaker, or a lens) and an element for wired and wireless communication, respectively. However, the function blocks 230, 240, and 250 are not limited to the elements described above.

Each of the function blocks 230, 240, and 250 may refer to an electronic circuit portion performing a function. The electronic circuit portion may be included in the terminal, and the portion may not be physically separated from the other portions of the electronic circuit or the terminal, as described above with reference to FIG. 1. Thus, each of the function blocks 230, 240, and 250 may be any one of a device for supplying power, a device for calculation and data processing, a modem device or an antenna for performing communication, an input device for collecting and inputting information, and an output device for outputting information. However, the function blocks 230, 240, and 250 are not limited to the devices for performing the functions described above.

Referring back to FIG. 1, the interface unit 110 senses whether one or more function blocks are connected. For example, the interface unit 110 senses whether one or more other function blocks are connected to the function block 100. If the interface unit 110 senses that one or more other function blocks are connected to the function block 100, the interface unit 110 may transmit a signal indicating the connection of one or more other function blocks with the function block 100 to the decision unit 120. The signal indicating the connection indicates that two or more function blocks are connected to each other in a wired or wireless manner. The wired connection may include connection of two or more function blocks through respective connection ports included therein.

The decision unit 120 determines indexes respectively corresponding to the connected function blocks. An index refers to a factor indicating each of two or more function blocks included in the terminal. For example, if the terminal includes N function blocks, each of the N function blocks may match any one element included in a set of indexes $X=[x_1, x_2, \ldots, x_N]$. The decision unit 120 extracts indexes corresponding to the connected function blocks from the set X of indexes based on the signal received from the interface unit 110.

The decision unit 120 decides a function to be performed by the connected function blocks from among various functions to be respectively performed by sets of one or more function blocks, based on the indexes. For example, the decision unit 120 may decide a function to be performed by the connected function blocks from among various functions included in a function set, based on the indexes. The function set refers to a set including information on functions to be performed by sets of one or more function blocks included in the terminal. An example of indexes and an example of decision on functions by the decision unit 120 will now be described with reference to FIGS. 3A and 3B.

Figures 3A, 3B:
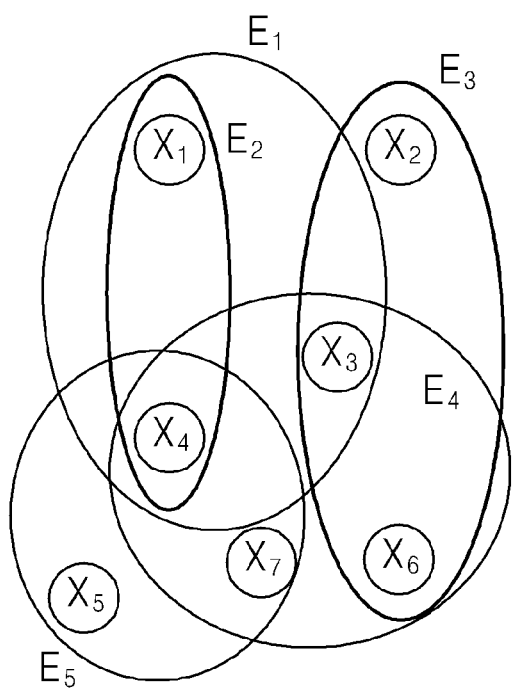
FIGS. 3A and 3B illustrate relationships between indexes and a function set according to an example embodiment.

FIGS. 3A and 3B illustrate relationships between indexes and a function set according to an example embodiment.

Referring to FIG. 3A, a diagram showing indexes $x_1$ to $x_7$ denoting seven function blocks included in the terminal and functions $E_1$ to $E_5$ included in the function set is shown.

Sets of the seven function blocks $x_1$ to $x_7$ for performing individual functions $E_1$ to $E_5$ may be different from each other. For example, the function blocks corresponding to the indexes $x_1$, $x_3$, and $x_4$ may be connected to perform the function $E_1$, and the function blocks corresponding to the indexes $x_3$, $x_4$, $x_6$, and $x_7$ may be connected to perform the function $E_4$. The indexes $x_1$ to $x_7$ denoting the seven function blocks, sets comprising the function blocks, and the functions $E_1$ to $E_5$ to be performed by connecting corresponding function blocks may be set in advance. The setting result may be stored in the storage unit 140 to be described below.

Referring to FIG. 3B, the diagram shown in FIG. 3A is illustrated in a form of a table.

Rows of the table of FIG. 3B refer to the functions $E_1$ to $E_5$ to be performed by sets of function blocks, and columns thereof refer to the indexes $x_1$ to $x_7$ denoting the seven function blocks.

Referring to the table of FIG. 3B, '1' is assigned to function blocks required to perform each function. For example, referring to the diagram of FIG. 3A, the function blocks corresponding to the indexes $x_1$, $x_3$, and $x_4$ need to be connected to perform the function $E_1$. Accordingly, referring to the table of FIG. 3B, '1' is assigned to the indexes $x_1$, $x_3$, and $x_4$ in a row 320 indicating the function $E_1$.

In the table of FIG. 3B, weights respectively corresponding to the functions $E_1$ to $E_5$ are assigned in the leftmost column 310. Information on the functions $E_1$ to $E_5$ to which the weights are assigned may be stored in the storage unit 140 to be described below. A role of a weight according to an example embodiment will be described below.

The decision unit 120 decides a function to be performed by the connected function blocks from among the various functions to performed by the sets of one or more function blocks, based on the indexes corresponding to the connected function blocks. For example, the decision unit 120 assigns '1' to the connected function blocks and '0' to the remaining disconnected function blocks, based on the signal received from the interface unit 110. Thereafter, the decision unit 120 decides a function to be performed by the connected function blocks by combining the assigned '1's and '0's.

A detailed method of deciding, by the decision unit 120, a function to be performed by the connected function blocks will be described below.

Referring back to FIG. 1, the decision unit 120 decides a function to be performed by connecting one or more function blocks. For example, the decision unit 120 may decide a function to be performed by the connected function blocks by combining indexes corresponding to the connected function blocks and weights corresponding to functions to be performed by the terminal. For example, the decision unit 120 may acquire a probability function based on a set of the indexes and the weights and calculate a maximum value of the probability function. Further, the decision unit 120 may decide a function corresponding to the calculated maximum value of the probability function.

The decided function may be performed by connecting two to five function blocks. Further, the number of function blocks included in the terminal may be 2 to 20 according to the number of functions to be performed by the terminal.

Thus, the decision unit 120 according to an example embodiment may decide a function by using a hypernetwork model formed based on indexes corresponding to the connected function blocks and weights corresponding to functions to be performed by the terminal. The hypernetwork refers to a probability graph model, which includes hypergraphs having respective weights.

A hypergraph is a random graph in which a proper weight is allocated to each edge. While two dots form one edge in a simple graph, a hypergraph indicates a graph in which two or more dots may form one edge. An edge included in a hypergraph is referred to as a hyperedge.

If it is assumed that the terminal includes N function blocks, and the number of functions to be performed by the terminal is M, a hypergraph is formed with a state vector (i.e., a set of indexes of the N function blocks) $X=[x_1, x_2, \ldots, x_N]$, a set of hyperedges (i.e., the functions to be performed by the terminal) $E=\{E_1, E_2, \ldots, E_M\}$, and a set of weights of the hyperedges $W=\{w_1, w_2, \ldots, w_M\}$.

According to an example embodiment, each hyperedge (i.e., function to be performed by the terminal) may be expressed by $E_i=\{x_{i_1}, x_{i_2}, \ldots, x_{i_k}\}$, wherein k denotes the number of function blocks required to perform the function $E_i$. For example, because a value of k is decided according to the number of function blocks required to perform each function, each function may be expressed by one hyperedge.

A detailed method of deciding, by the decision unit 120, a function to be performed by a set of function blocks, by using a hypernetwork will be described below with reference to FIGS. 4 to 6.

Figure 4:
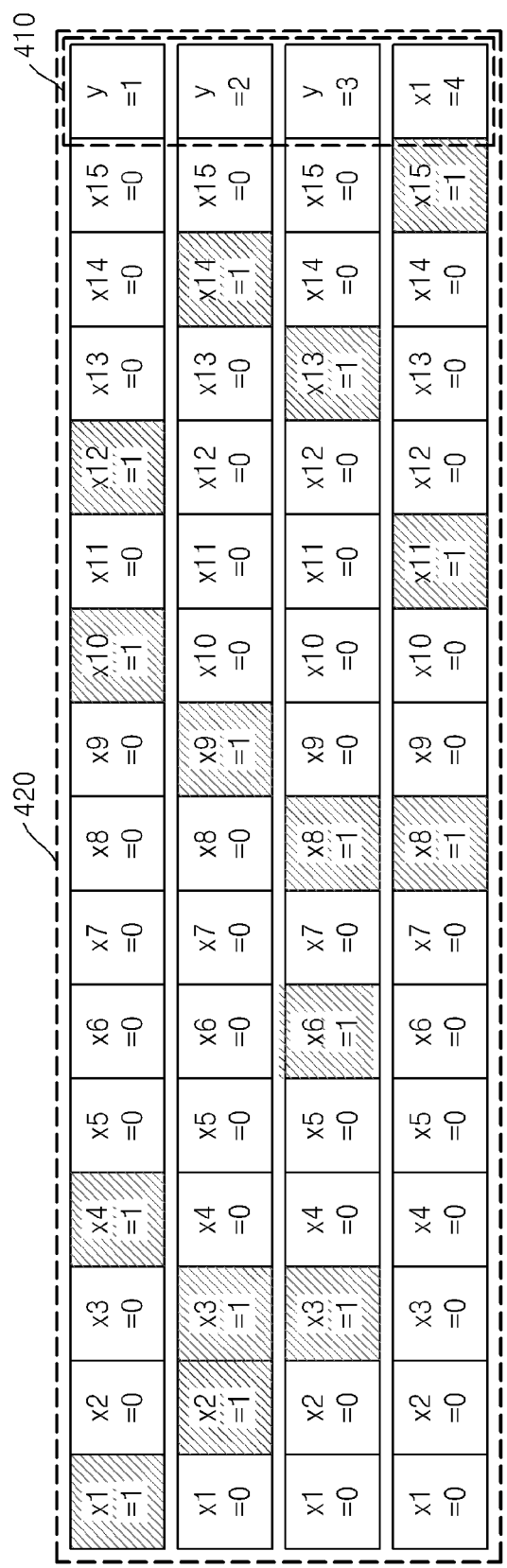
FIG. 4 is a table illustrating relationships between function blocks and functions according to an example embodiment.

FIG. 4 is a table illustrating relationships between function blocks and functions according to an example embodiment.

Referring to FIG. 4, the last column 410 of the table indicates functions to be performed by sets of function blocks, and a matrix 420 except for the last column 410 of the table indicates sets of function blocks for performing respective functions. The table of FIG. 4 illustrates that the terminal includes 15 different function blocks, and the number of functions to be performed by the terminal (i.e., functions to be performed by connecting function blocks) is 4.

The decision unit 120 assigns '1' to the connected function blocks and '0' to the remaining function blocks, based on the signal received from the interface unit 110. For example, if function blocks corresponding to indexes $x_1$, $x_4$, $x_{10}$, and $x_{12}$ are connected to each other, the decision unit 120 assigns '1' to the connected function blocks corresponding to the indexes $x_1$, $x_4$, $x_{10}$, and $x_{12}$ and '0' to function blocks corresponding to the remaining indexes.

Thereafter, the decision unit 120 decides a first function (y=1) to be performed by the connected function blocks by using the hypernetwork model. For example, the decision unit 120 may detect a hyperedge in which the function blocks to which '1' is assigned in a hypergraph (i.e., function blocks corresponding to the indexes $x_1$, $x_4$, $x_{10}$, and $x_{12}$) are combined. Thereafter, the decision unit 120 may decide the first function (y=1) corresponding to the detected hyperedge as the function to be performed by the connected function blocks.

As the number of function blocks to be connected to perform a function increases (i.e., the more the number of function blocks included in a hyperedge), a computation amount to be performed by the decision unit 120 also increases. For example, as the number of function blocks to be connected to perform a function increases, the complexity of a mathematical computation to be performed by the decision unit 120 also increases.

Thus, the decision unit 120 according to an example embodiment segments each hyperedge into hyperedges formed with three maximum function blocks (hereinafter, referred to as "sub-hyperedges). Further, the decision unit 120 decides a function (i.e., a hyperedge) to be performed by the connected function blocks, by using sub-hyperedges. Sub-hyperedges and an operation of the decision unit 120 will now be described in detail with reference to FIG. 5.

Figure 5:
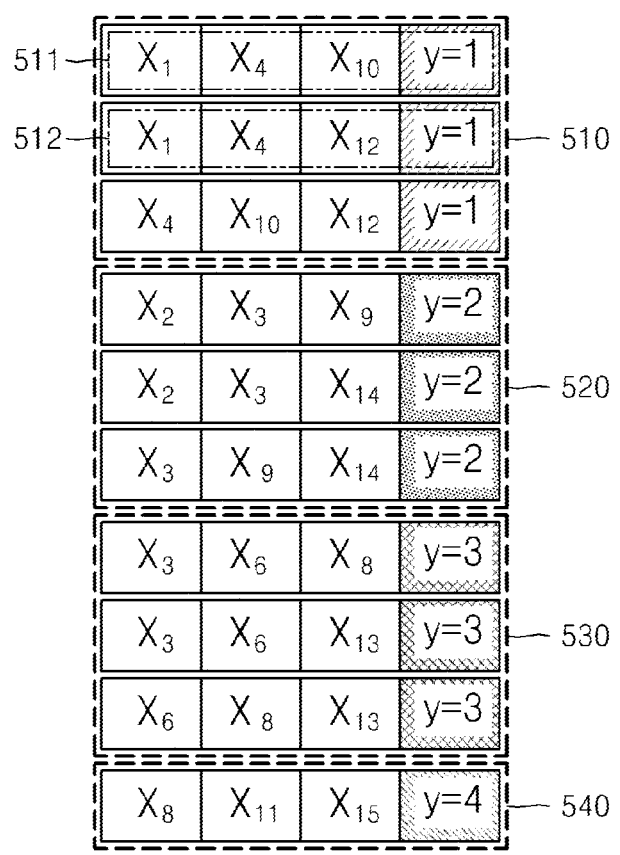
FIG. 5 illustrates sub-hyperedges according to an example embodiment.

FIG. 5 illustrates sub-hyperedges according to an example embodiment.

Referring to FIG. 5, a table, in which indexes of three function blocks are combined, is illustrated, wherein three combined function blocks form one sub-hyperedge.

Referring to FIG. 4, a hyperedge corresponding to the first function (y=1) is formed with a total of four function blocks $x_1$, $x_4$, $x_{10}$, and $x_{12}$, a hyperedge corresponding to a second function (y=2) is formed with a total of four function blocks $x_2$, $x_3$, $x_9$, and $x_{14}$, a hyperedge corresponding to a third function (y=3) is formed with a total of four function blocks $x_3$, $x_6$, $x_8$, and $x_{13}$, and a hyperedge corresponding to a fourth function (y=4) is formed with a total of three function blocks $x_8$, $x_{11}$, and $x_{15}$.

Referring back to FIG. 5, the table of FIG. 5 is an example formed based on the table of FIG. 4. For example, because the hyperedge corresponding to the first function (y=1) is formed with a total of four function blocks $x_1$, $x_4$, $x_{10}$, and $x_{12}$, the hyperedge corresponding to the first function (y=1) shown in FIG. 4 may be represented by a first set of three sub-hyperedges 510, each being formed by combining three function blocks. Likewise, the hyperedge corresponding to the second function (y=2) shown in FIG. 4 may also be represented by a second set of three sub-hyperedges 520, and the hyperedge corresponding to the third function (y=3) shown in FIG. 4 may be represented by a third set of three sub-hyperedges 530. However, because the hyperedge corresponding to the fourth function (y=4) is formed with a total of three function blocks $x_8$, $x_{11}$, and $x_{15}$, a sub-hyperedge 540 corresponds to the hyperedge corresponding to the fourth function (y=4).

The decision unit 120 determines indexes respectively corresponding to the connected function blocks by using the signal received from the interface unit 110. If the number of connected function blocks is 4 or greater, the decision unit 120 may forms group, each group being formed by combining three indexes from among the determined indexes. For example, if the determined indexes are $x_1$, $x_4$, $x_{10}$, and $x_{12}$, the decision unit 120 forms a first group ($x_1$, $x_4$, and $x_{10}$), a second group ($x_1$, $x_4$, and $x_{12}$), and a third group ($x_4$, $x_{10}$, and $x_{12}$) by combining three indexes for respective groups.

Thereafter, the decision unit 120 forms sub-hyperedges by using the indexes included in the first to third groups. For example, the decision unit 120 forms a first sub-hyperedge by using the indexes included in the first group ($x_1$, $x_4$, and $x_{10}$), a second sub-hyperedge by using the indexes included in the second group ($x_1$, $x_4$, and $x_{12}$), and a third sub-hyperedge by using the indexes included in the third group ($x_4$, $x_{10}$, and $x_{12}$).

Thereafter, the decision unit 120 forms a hyperedge based on the formed first to third sub-hyperedges. Thereafter, the decision unit 120 decides a function to be performed by the connected function blocks, based on the formed hyperedge. For example, the decision unit 120 forms a hyperedge based on the first to third sub-hyperedges. For example, the decision unit 120 forms one hyperedge by combining the first to third sub-hyperedges. Thereafter, the decision unit 120 decides the first function (y=1) to be performed by the connected function blocks, based on the formed hyperedge.

As described above, if four or more function blocks are connected, the decision unit 120 may quickly decide a function to be performed by the four connected function blocks by forming sub-hyperedges.

A sub-hyperedge formed by the decision unit 120 according to an example embodiment may refer to one sub-function, wherein the sub-function refers to a specific sub-function included in a desired (or, alternatively predetermined) function. For example, if the first set of three sub-hyperedges 510 illustrated in FIG. 5 refer to an image capturing function, one sub-hyperedge 511 may correspond to a front image capturing function, and another sub-hyperedge 512 may correspond to a panorama image capturing function.

To perform each sub-function, a unique weight may be allocated to each sub-hyperedge. Information on each sub-hyperedge to which a weight is allocated may be stored in the storage unit 140 to be described below.

As described above, the decision unit 120 decides a function to be performed by the connected function blocks, by using a hypernetwork model in which hypergraphs (e.g., hyperedges, and sub-hyperedges) are combined. An operation of deciding a function by the decision unit 120 will now be described with reference to FIG. 6.

Figure 6:
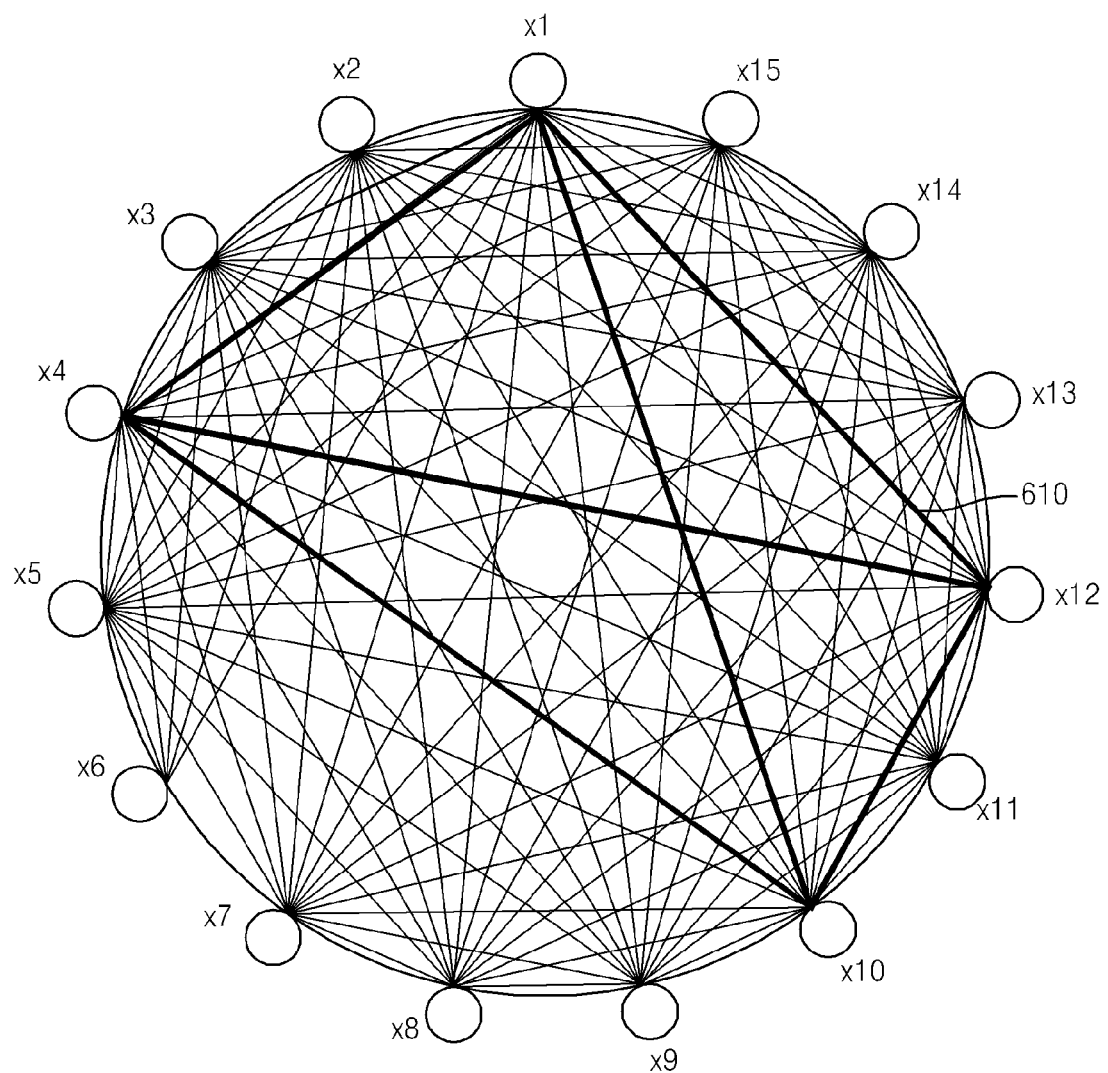
FIG. 6 illustrates a hypernetwork according to an example embodiment.

FIG. 6 illustrates a hypernetwork according to an example embodiment.

Referring to FIG. 6, hyperedges formed with sets of a total of fifteen function blocks ($x_1$ to $x_{15}$) are shown. For example, function blocks corresponding to indexes $x_1$, $x_4$, $x_{10}$, and $x_{12}$ form one hyperedge 610, and the hyperedge 610 includes a total of three sub-hyperedges.

The decision unit 120 decides a function to be performed by connected function blocks, by combining indexes x corresponding to the connected function blocks and weights W corresponding to functions to be respectively performed by function blocks. A detailed method in which the decision unit 120 decides a function is as described below.

The decision unit 120 may calculate energy $E(x^{(n)}|W)$ of each hyperedge included in the hypernetwork by using an equation (1).

$$E(x^{(n)}|W) = - \sum_{i1,i2,\ldots ik} w^{(k)}_{i1,i2,\ldots ik} x^{(n)}_{i1} x^{(n)}_{i2} \ldots x^{(n)}_{ik} \qquad (1)$$

In the equation (1), $w_{i1,i2,\ldots,ik}^{(k)}$ denotes the weights W respectively corresponding to the functions to be performed by the function blocks, and $x_{i1}^{(n)} x_{i2}^{(n)} \ldots x_{ik}^{(n)}$ denotes values assigned to the indexes x. For example, if the function blocks corresponding to indexes $x_1$, $x_4$, $x_{10}$, and $x_{12}$ are connected, 1 is substituted for each of $x_1^{(n)}$, $x_4^{(n)}$, $x_{10}^{(n)}$, and $x_{12}^{(n)}$, and 0 is substituted for the remaining indexes.

The decision unit 120 may calculate a probability graph model of the hypernetwork by using the energy $E(x^{(n)}|W)$ of each hyperedge. In detail, the decision unit 120 may calculate a probability graph model $P(x^{(n)}|W)$ of the hypernetwork by using an equation (2).

$$P(x^{(n)}|W) = \frac{1}{Z(W)} \left[ \sum_{k=1}^{K} \exp\left( \sum_{i1,i2,\ldots ik} w^{(k)}_{i1,i2,\ldots ik} x^{(n)}_{i1} x^{(n)}_{i2} \ldots x^{(n)}_{ik} \right) \right] \qquad (2)$$

In the equation (2), Z(W) denotes a normalization constant and may be calculated by using Equation (3).

$$Z(W) = \sum_{x^{(n)}} \exp(-E(x^{(n)}|W)) = \sum_{x^{(n)}} \exp\left( \sum_{i1,i2,\ldots ik} w^{(k)}_{i1,i2,\ldots ik} x^{(n)}_{i1} x^{(n)}_{i2} \ldots x^{(n)}_{ik} \right) \qquad (3)$$

The decision unit 120 may calculate a maximum value of a probability function according to an input (e.g., connected function blocks) by using the equations (2) and (3). Thereafter, the decision unit 120 decides a hyperedge corresponding to the calculated maximum value and decides a function corresponding to the decided hyperedge as a function to be performed by the connected function blocks.

In the equations (1), (2), and (3), the weights W may be set in advance. For example, if a set $F=\{x^{(n)}\}_{n=1}^{N}$ denoting function blocks included in the terminal and functions thereof is given, weights may be set in advance in the hypernetwork to recognize and manage the functions.

The decision unit 120 sets the respective weights W corresponding to functions (i.e., hyperedges) to be performed by the function blocks. Thereafter, the decision unit 120 stores the set weights W in the storage unit 140 to be described below. By the decision unit 12 setting in advance the respective weights W corresponding to the hyperedges, the decision unit 120 may accurately decide hyperedges (e.g., functions to be performed by connected function blocks) from the hypernetwork model.

The decision unit 120 may set the weights W by using an equation (4).

$$P(F|W) = \prod_{n=1}^{N} P(x^{(n)}|W) \qquad (4)$$

In the equation (4), F denotes a set of function blocks included in the terminal and functions thereof, and N denotes the number of function blocks included in the terminal.

The decision unit 120 sets the weights W so that a probability P(F|W) calculated using the equation (4) is maximized.

The decision unit 120 decides a function to be performed by the connected function blocks by using the equations (1) to (4). For example, the decision unit 120 may calculate y so that a probability function is maximized according to the equations (1) to (3), by using a set X of indexes corresponding to the connected function blocks. Thereafter, the decision unit 120 detects a hyperedge corresponding to the calculated y and decides a function corresponding to the detected hyperedge as a function to be performed by the connected function blocks. Further, the decision unit 120 calculates a weight corresponding to each hyperedge by using the equation (4).

As described above, the decision unit 120 may quickly and accurately decide a function to be performed by connected function blocks, by using the hypernetwork model, when two or more function blocks are connected.

Referring back to FIG. 1, the control unit 130 generates a control signal for performing the decided function. For example, the control unit 130 may generate a signal for controlling a function block so that the function decided by the decision unit 120 is performed. The signal for controlling a function block may be a signal for controlling the function block 100 or may be a signal for controlling another connected function block.

The storage unit 140 stores information on functions to be performed by sets of one or more function blocks. For example, the storage unit 140 may store information on functions included in a function set. For example, the storage unit 140 may store information on hyperedges included in the hypernetwork model and weights respectively allocated to the hyperedges. Further, the storage unit 140 may store information on sub-hyperedges and weights respectively allocated to the sub-hyperedges.

The information stored in the storage unit 140 may be updated using other information input to the storage unit 140. The information stored in the storage unit 140 may be the information on the hyperedges included in the hypernetwork model and the weights respectively allocated to the hyperedges.

Functions to be performed by connecting function blocks according to example embodiments may be added or removed. For example, preset types of functions may be added or removed based on input information. A function may be implemented by a hyperedge included in the hypernetwork model and a weight allocated to the hyperedge. Thus, the storage unit 140 may add or remove functions in correspondence with a user's request by updating the pre-stored hypernetwork model based on input information. A detailed method in which the storage unit 140 updates stored information is described below.

For example, the storage unit 140 may update information based on information included in a received external signal. For example, the storage unit 140 may update pre-stored information by using information included in an external signal input through the interface unit 110. For example, the storage unit 140 may add or remove a hyperedge included in the pre-stored hypernetwork model and a weight allocated to the hyperedge by using information included in an external signal, wherein the external signal may be input to the interface unit 110 by using a wired/wireless network connected to the function block 100 but is not limited thereto.

As another example embodiment, the storage unit 140 may update information by using information acquired through supervised learning. For example, the decision unit 120 may acquire information through supervised learning, and the storage unit 140 may update information by using the information acquired by the decision unit 120. For example, the decision unit 120 may learn a weight so that a probability function for an arbitrary set of function blocks, which is input through the interface unit 110, has a maximum value. The decision unit 120 may learn a weight by using the equations (1) to (4) so that a probability function for the input arbitrary set of function blocks has a maximum value.

The decision unit 120 transmits information on the arbitrary set of input function blocks and information on the learned weight to the storage unit 140. The storage unit 140 may add a hyperedge included in the pre-stored hypernetwork model and a weight allocated to the hyperedge based on the received information.

FIG. 7 is a flowchart of a method of performing a function by combining one or more function blocks, according to an example embodiment.

FIG. 7 is a flowchart of a method of performing a function by connected function blocks. Referring to FIG. 7, the method of performing a function by connected function blocks includes operations sequentially performed by the function block 100 of FIG. 1. Thus, although omitted below, the description above about the function block 100 of FIG. 1 is also applied to the method of performing a function by connected function blocks as illustrated in FIG. 7.

In operation 710, the interface unit 110 senses whether one or more function blocks are connected. The function block 100 refers to an element for performing any one of the functions of the terminal. The function block 100 may refer to a unit of two or more function blocks that are physically separated from the terminal or a segmented unit corresponding to a respective function to be performed by the terminal. For example, the interface unit 110 may sense whether one or more other function blocks are connected to the function block 100.

In operation 720, the decision unit 120 determines indexes respectively corresponding to the connected function blocks. An index refers to a factor indicating each of two or more function blocks included in the terminal.

In operation 730, the decision unit 120 decides a function to be performed by the connected function blocks from among functions to be respectively performed by sets of one or more function blocks, by using the indexes. In other words, the decision unit 120 decides a function to be performed by the connected function blocks from among functions included in a function set, based on the indexes. The function set refers to a set including information on functions to be performed by sets of blocks included in the terminal.

In operation 740, the control unit 130 generates a control signal for performing the decided function. For example, the control unit 130 may generate a signal for controlling a function block so that the function decided by the decision unit 120 is performed. The signal for controlling a function block may be a signal for controlling the function block 100 or a signal for controlling another connected function block.

As described above, according to example embodiments, a terminal may include function blocks (which are separable from each other) for performing respective functions, and the function blocks may perform a desired (or, alternatively predetermined) function, taken alone or in combination. According to example embodiments, a user may combine two or more function blocks for a desired function, and thus, the user may easily manage and improve individual functions. Further, the use of functions undesired by the user may be limited, thereby preventing unnecessary power consumption.

According to example embodiments, each of the function blocks may include a distributed device operating system, and thus, each combined function block may be automatically set to perform a function corresponding to the combination.

According to example embodiments, information indicating functions to be respectively performed by sets of function blocks may be stored and updated, thereby extending functions to be performed by the sets of the function blocks.

The method described above can be written as computer programs and can be implemented in general-use digital computers that execute the programs using a computer-readable recording medium. Further, a structure of data used in the method described above may be recorded on a computer-readable recording medium through various units. Examples of the computer-readable recording medium include storage media, for instance, magnetic storage media (e.g., ROM, RAM, USB, floppy disks, or hard disks), optical recording media (e.g., CD-ROMs or DVDs), and PC interfaces (e.g., PCI, PCI-expressor WiFi).

Other example embodiments can be implemented through computer-readable code and/or instructions in/on a medium, e.g., a computer-readable medium, to control at least one processing element to implement any example embodiment described above. The medium can correspond to any medium or media permitting the storage and/or transmission of the computer-readable code.

The computer-readable code can be recorded and/or transferred on and/or to a medium in a variety of ways. Examples of the medium may include recording media, for instance, magnetic storage media (e.g., ROM, floppy disks, or hard disks and optical recording media (e.g., CD-ROMs or DVDs), and transmission media (e.g., Internet transmission media). Thus, the medium may be a defined and measurable structure including or carrying a signal or information, for instance, a device carrying a bitstream according to one or more example embodiments. The media may also be a distributed network so that the computer-readable code is stored, transferred and/or or executed in a distributed fashion. Furthermore, the processing element could include a processor or a computer processor, and processing elements may be distributed and/or included in a single device.

While the present invention has been particularly shown and described with reference to example embodiments thereof, it will be understood by those of ordinary skill in the art that various changes in form and details may be made therein without departing from the spirit and scope of example embodiments as defined by the following claims. The example embodiments should be considered in a descriptive sense only and not for purposes of limitation. Therefore, the scope of example embodiment is defined not by the detailed description of the example embodiments but by the appended claims, and all differences within the scope will be construed as being included in example embodiments.

What is claimed is:

1. A method of performing a function in an apparatus which comprises function blocks, the method comprising:
   sensing whether the function blocks are connected;
   determining indexes respectively corresponding to the connected function blocks;
   deciding, by using at least one combination of sub-hyperedges, a function to be performed based on the sensing, the function being one of a plurality of functions, each function associated with a respective set of the function blocks; and
   generating a control signal for performing the decided function,
   wherein each of the sub-hyperedges indicates some of the connected function blocks.
2. The method of claim 1, further comprising:
   storing information indicating the function.
3. The method of claim 2, further comprising:
   updating the stored information based on information included in a received external signal.
4. The method of claim 2, further comprising:
   updating the stored information based on information acquired through supervised learning.
5. The method of claim 1, wherein the deciding comprises:
   deciding the function by combining the indexes and weights, the weights corresponding to the function.
6. The method of claim 5, wherein the deciding comprises:
   calculating a maximum value of a probability function, the probability function acquired based on the combination of the indexes and the weights; and
   deciding the function corresponding to the calculated maximum value.
7. The method of claim 1, wherein the deciding comprises:
   deciding the function by using a hypernetwork model formed based on the indexes and weights, the weights corresponding to the function.
8. The method of claim 1, wherein more than one function blocks are connected to each other, and the function blocks are physically separable from a terminal.
9. The method of claim 1, wherein one of the function block is an independent device or an electronic circuit portion, and is configure to perform the function.
10. A non-transitory computer-readable storage medium having stored therein program instructions, which when executed by a computer, perform the method of claim 1.
11. An apparatus comprising:
    an interface unit configured to sense whether the one or more function blocks are connected;
    a decision unit configured to determine indexes respectively corresponding to the connected function blocks, and configured to decide, by using at least one combination of sub-hyperedges, a function to be performed based on the sensing, the function being one of a plurality of functions, each function associated with a respective set of the connected function blocks; and
    a control unit configured to generate a control signal for performing the decided function,
    wherein each of the sub-hyperedges indicates some of the connected function blocks.
12. The apparatus of claim 11, further comprising:
    a storage unit configured to store information indicating the function.
13. The apparatus of claim 12, wherein the storage unit is configured to update the stored information based on information included in a received external signal.
14. The apparatus of claim 12, wherein the decision unit is configured to acquire information through supervised learning, and the storage unit is configured to update the stored information based on the acquired information.
15. The apparatus of claim 11, wherein the decision unit is configured to decide the function by combining the indexes and weights, the weights corresponding to the function.
16. The apparatus of claim 15, wherein the decision unit is configured to calculate a maximum value of a probability function, the probability function acquired based on the combination of the indexes and the weights and is configured to decide the function corresponding to the calculated maximum value.
17. The apparatus of claim 11, wherein the decision unit is configured to decide the function by using a hypernetwork model formed based on the indexes and weights, the weights corresponding to the function.
18. The apparatus of claim 11, wherein the function block is a unit of two or more function blocks that are physically separable from a terminal.
19. The apparatus of claim 11, wherein one of the function block is an independent device or an electronic circuit portion, and is configured to perform the function.

* * * * *